United States Patent
Leonessi

(10) Patent No.: US 9,294,610 B2
(45) Date of Patent: Mar. 22, 2016

(54) EMERGENCY ALERT SYSTEM AND PROGRAM FOR PORTABLE DEVICES

(71) Applicant: VENTUNO INVEST S.R.L., Arezzo (IT)

(72) Inventor: Luca Leonessi, Arezzo (IT)

(73) Assignee: GECOM S.P.A., Rome (IT)

(*) Notice: Subject to any disclaimer, the term of this patent is extended or adjusted under 35 U.S.C. 154(b) by 0 days.

(21) Appl. No.: 14/268,511

(22) Filed: May 2, 2014

(65) Prior Publication Data

US 2015/0319284 A1  Nov. 5, 2015

(51) Int. Cl.
  *H04M 1/72* (2006.01)
  *H04M 1/725* (2006.01)
  *H04W 4/22* (2009.01)

(52) U.S. Cl.
  CPC ............ *H04M 1/72541* (2013.01); *H04W 4/22* (2013.01)

(58) Field of Classification Search
  CPC . H04M 1/72541; G08B 25/016; G08B 21/02; G08B 21/0244; G08B 25/001; G06F 3/041; G06Q 10/109; H04W 4/22
  See application file for complete search history.

(56) References Cited

U.S. PATENT DOCUMENTS

| | | | | |
|---|---|---|---|---|
| 8,774,752 | B1* | 7/2014 | Akcasu et al. | 455/404.1 |
| 2012/0003955 | A1* | 1/2012 | Gabriel | 455/404.2 |
| 2013/0040600 | A1* | 2/2013 | Reitnour et al. | 455/404.2 |
| 2013/0183924 | A1* | 7/2013 | Saigh et al. | 455/404.2 |
| 2014/0171011 | A1* | 6/2014 | Diamond | H04W 4/22 455/404.1 |
| 2015/0038109 | A1* | 2/2015 | Salahshour | H04W 4/22 455/404.2 |
| 2015/0153443 | A1* | 6/2015 | Van Taunay | G01S 5/14 702/150 |
| 2015/0281930 | A1* | 10/2015 | Ben-Porath | H04W 4/22 455/404.2 |

* cited by examiner

*Primary Examiner* — Hirdepal Singh
(74) *Attorney, Agent, or Firm* — Young & Thompson

(57) ABSTRACT

A system and software application that communicates with a central service for alerting a security service that help is needed, wherein an application running on a smart phone causes identity information, location information, and an emergency alert to be transmitted to an emergency response facility either by a single button press or a delayed countdown, or else, in the even that a data network is unavailable, presents an interface to directly dial an emergency response service with a single button press.

20 Claims, 9 Drawing Sheets

EMERGENCY ALERT SYSTEM AND PROGRAM FOR PORTABLE DEVICES

FIELD OF THE INVENTION

The present invention relates to a method, and software application for communicating and alerting a security service that help is needed. The invention also relates to a system with a server computing device and at least one client computing device in communication with each other via one or more communication networks, the client device configured to run a software application configured to contact the server over the one or more networks to alert a security service that the operator of the client device requires help in an emergency situation.

BACKGROUND OF THE INVENTION

Mobile devices such as cell phones or "smart phones" enable a user of such devices to contact emergency services at any time such a device is within range of a connectable (e.g., wireless) communications network. However, the capability of such devices to emergency services or security services often requires a plurality of careful and time-consuming steps. For example, a user may be required to perform each and all of activating the device, launching a communications application, dialing a country-specific emergency code or number, waiting for the emergency responder to pick up, and then vocally providing necessary information to the responder sufficient to enable the responder to send help where it is needed.

Performing these steps may not be practical (or possible) in an actual emergency.

Further, an important part of reporting an emergency is that the user provide his or her location information to the responder. Again, however, in an emergency situation, the user may not be able to fully or adequately communicate such information.

Yet further, these steps are based in older, wire-based voice communications and do not take advantage of the enhanced capabilities of modern wireless communications devices.

SUMMARY OF THE INVENTION

The object of the invention is to provide a solution to the above problems by providing an automated system that enables a user of a networked electronic device, particularly a mobile electronic device such as a cell phone or smart phone (although the invention may also function with a non-mobile or lesser mobile device, such as a desktop or laptop computer, comprising sufficient communication and geo-location devices), to contact emergency services and provide such services with information required for mounting a response, all with minimal effort in view of the distress and/or injury the user may experience during an actual emergency.

In order to accomplish this object, an exemplary embodiment of the invention comprises a system that includes a server computing device associated with the emergency response center, a client computing device associated with an emergency response center, a communications network capable of transmitting messages between the server device and the client device, wherein each of the server device and the client device comprise a CPU and a memory, wherein the client device further comprises an interactive display device and one or more communications interfaces capable of communicating with each of a telephone network, a geo-location network, and a data network, and wherein the client device has software encoded on a non-transient encoding medium readable by the client device sufficient to cause the client device to display, on the display device, a first control and a second control, the first control, upon activation by a user, causing the client device to send location information, acquired from the geo-location network, and an emergency alert to server device via the data network, the second control, upon activation by the user, causing the client device to send location information acquired from the geo-location network, and a pre-alarm alert, to the server device via the data network, query the user for a time delay value, upon receiving the time delay value, initiate a count-down operation in accordance with the time delay value, and display a cancel control on the display device, in the event that the cancel control is activated by the user prior to expiration of the count-down, cancel the count-down operation, and in the event that the cancel control is not activated prior to the expiration of the count-down, send an emergency alert to the server device.

In another non-limiting, exemplary embodiment, the invention is a method for communicating emergency information between a client computing device and a server computing device associated with an emergency response center, the client device and the server device being in connection with each other over a communications network, the method having the steps of displaying, on a display device of the client device, a first control and a second control, causing, upon activation by a user of the first control, the client device to send location information acquired from a geo-location device built-in to the client device, and an emergency alert, to the server device via a communications interface of the client device in connection with the communications network to which the server device is capable of communicating, causing, upon activation by the user of the second control, the client device to send location information acquired from the geo-location device, and pre-alarm alert, to the server device via the communications interface, query the user for a time delay value, upon receiving the time delay value, initiate a count-down operation in accordance with the time delay value and display a cancel control on the display device, in the event that the cancel control is activated by the user prior to expiration of the count-down, canceling the count-down operation, and in the event that the cancel control is not activated prior to the expiration of the count-down, sending an emergency alert to the server device.

In yet another non-limiting, exemplary embodiment, the invention is a software application configured to cause a CPU of a computer device to perform the steps of displaying, on a display device of the device, a first control and a second control, the first control, upon activation by a user, causing the device to send location information, acquired from a geo-location device built-in to the computer device, and an emergency alert to an emergency response server associated with an emergency response center via a communications interface of the computer device in connection with a communications network to which the emergency response server is capable of communicating, the second control, upon activation by the user, causing the device to send location information acquired from the geo-location device, and a pre-alarm alert, to the emergency response server via the communications interface, query the user for a time delay value, upon receiving the time delay value, initiate a count-down operation in accordance with the time delay value, and display a cancel control on the display device, in the event that the cancel control is activated by the user prior to expiration of the count-down, cancel the count-down operation, and in the event that the cancel control is not activated prior to the expiration of the count-down, send an emergency alert to the emergency response server.

Further embodiments and features of the invention are described in relation to the drawings and the description that follow.

DETAILED DESCRIPTION OF THE PREFERRED EMBODIMENTS

Figure 1:
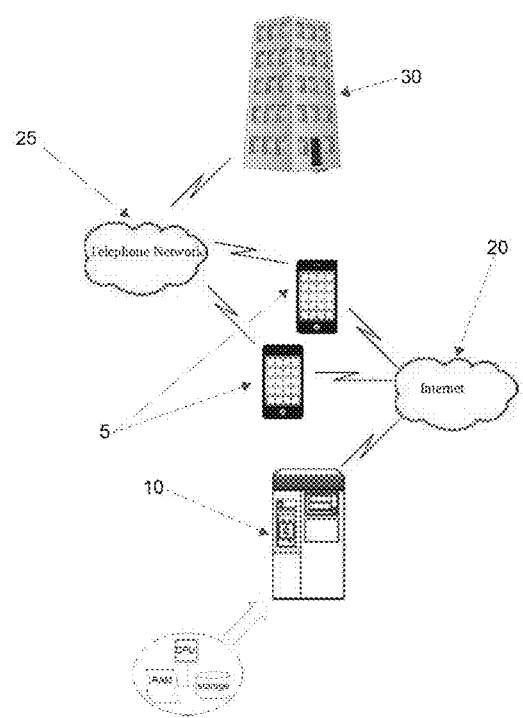
FIG. 1 shows a diagram of a networked system according to the invention.

According to a non-limiting, exemplary embodiment of the inventive system, one or more portable electronic devices 5 (see FIG. 1), each comprising a CPU, memory (RAM), a storage device, and a display screen, and each including communication devices capable of connection with a telephone network 25 (e.g., a cellular telephone network, or switch-based telecommunications network), a data network 20 (e.g., the Internet via 3G, 4G, WiFi, or the like), and a geo-location system (e.g., the Global Positioning System ("GPS") or equivalent). Preferably, the portable electronic device 5 comprises a touch-sensitive display screen in order to receive input from the user. Such a portable electronic device may be, for example, an iPhone® operating with the iOS® operating system, a smart phone operating with the Android® operating system, or any such portable computing device (i.e., "smart phone") that includes communications interfaces for wirelessly communicating with a data network and a telephone network.

In addition, an emergency response server 10, comprising a CPU, memory (RAM), and a storage device, is provided in connection with the Internet and thereby capable of connection with the one or more portable electronic devices 5.

In accordance with an exemplary embodiment of the invention, a software application ("app") is provided that is loadable onto a storage device of a portable electronic device 5 and executable on a CPU of the portable electronic device 5 that facilitates communication with at least one of the emergency response server 10 and an emergency response center 30.

Figure 2:
FIG. 2 shows a view of an authentication interface in accordance with the invention on a portable computing device.
Figure 9:
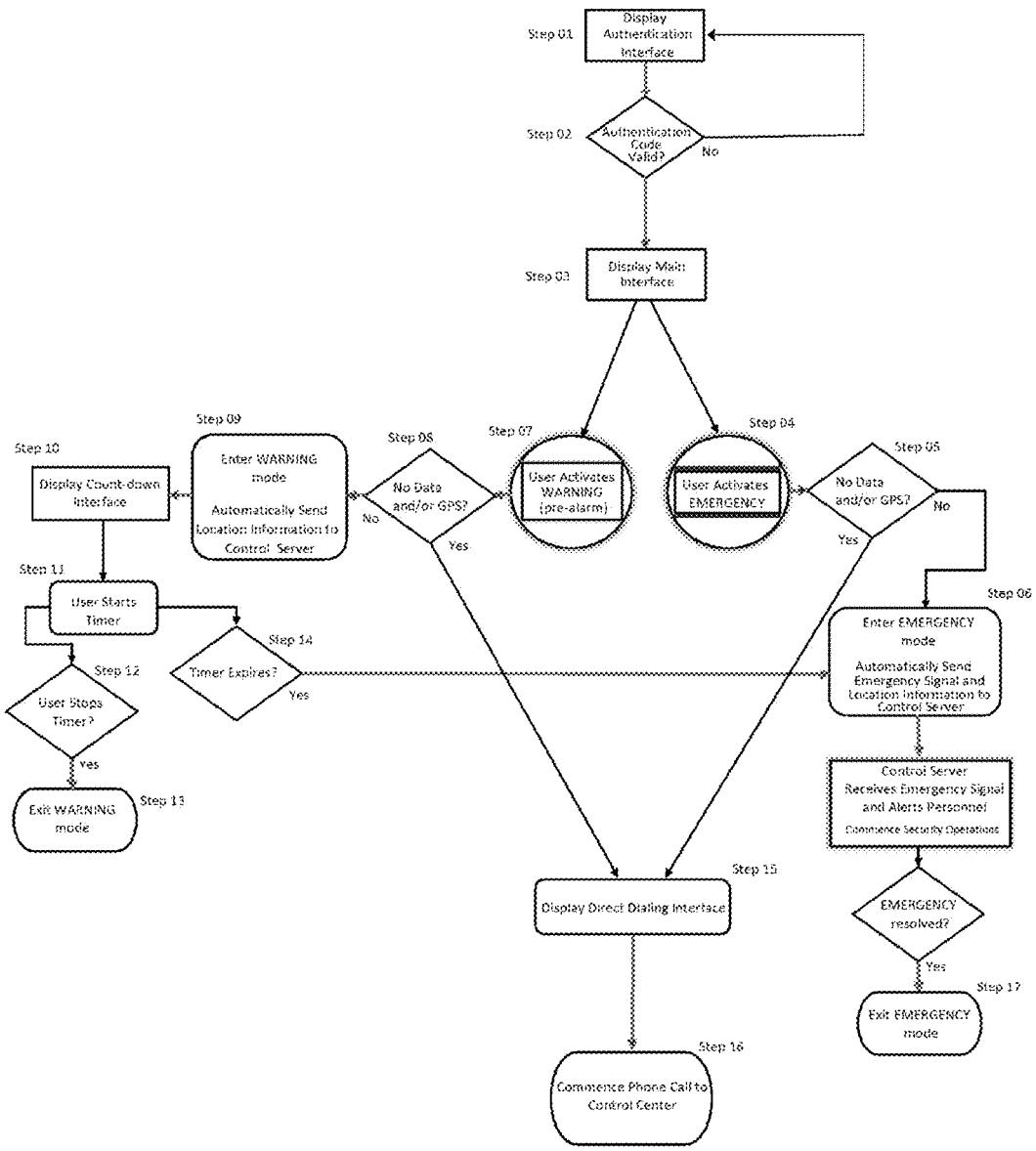
FIG. 9 is a flow-chart illustrating steps in accordance with the invention.

In a preferred embodiment of the invention, the app according to the invention causes the portable electronic device 5, upon launch or activation, to prompt the user of the portable electronic device 5 to enter an authentication code for authenticating with the emergency response server 10 (see Step 01 in the flow-chart of FIG. 9). A field 50 is provided in an authentication interface (see FIG. 2) for providing the authentication code, and upon successful connection and authentication (Step 02), a main interface as shown in FIG. 3 is enabled (Step 03).

Figure 3:
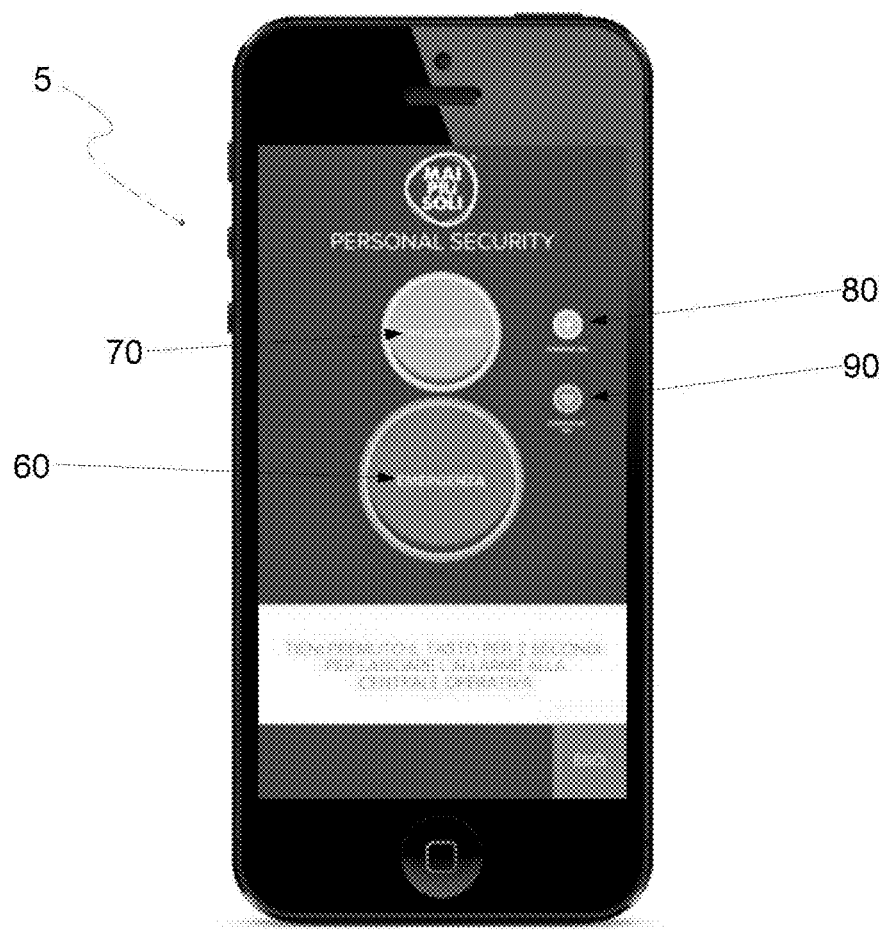
FIG. 3 shows a view of a main interface in accordance with the invention on a portable computing device.

In the main interface of FIG. 3, the portable electronic device 5 displays a first control 60 and a second control 70. In a preferred embodiment, first and second indicators 80, 90 are also displayed.

The first indicator 80 indicates a status of a connection with the geo-location network for establishing a spatial location of the portable electronic device 5. The first indicator appears in a first color (e.g., red) if the geo-location device is not operating, a second color (e.g., yellow) if the geo-location device is in a process of activation (e.g., acquiring connection with GPS satellites), and a third color (e.g., green) if the geo-location device is connected to a geo-location network and is operating normally for establishing the location of the portable electronic device 5.

The second indicator 90 indicates a status of a connection or connectability with the emergency response server 10. The second indicator appears in a first color (e.g., red) if the emergency response server 10 in unreachable, a second color (e.g., yellow) if the emergency response server 10 in the process of activation (e.g., performing handshaking or authentication), and a third color (e.g., green) if the emergency response server 10 is reachable via the data network 20 and is operating normally for receiving messages from the portable electronic device 5.

In accordance with a preferred embodiment of the invention, the main interface presents two main controls for rapidly sending a message to the emergency response server 10 for requesting assistance and/or reporting an emergency. A first control 60, which in a particularly preferred embodiment is larger and in a different color (e.g., red) than that of a second control 70, is directed to, upon activation (Step 04), immediately cause the portable electronic devices 5 to enter an emergency mode (Step 06) and thereby transmit, via the data network 20, identification information (based on the authentication code provided by the user), location information (based on information determined by the geo-location device), and an emergency alert to the emergency response server 10.

In a preferred embodiment, the first control 60 operates in the manner of a push button, which activates when the user places a finger on an image of the first control 60 on the display screen. In a particularly preferred embodiment, the first control 60 does not activate unless the user places a finger on the image of the first control 60 and also holds it there for at least a short pre-determined time, most preferably two seconds, thereby avoiding accidental or unintentional activation of the first control 60.

Figure 4:
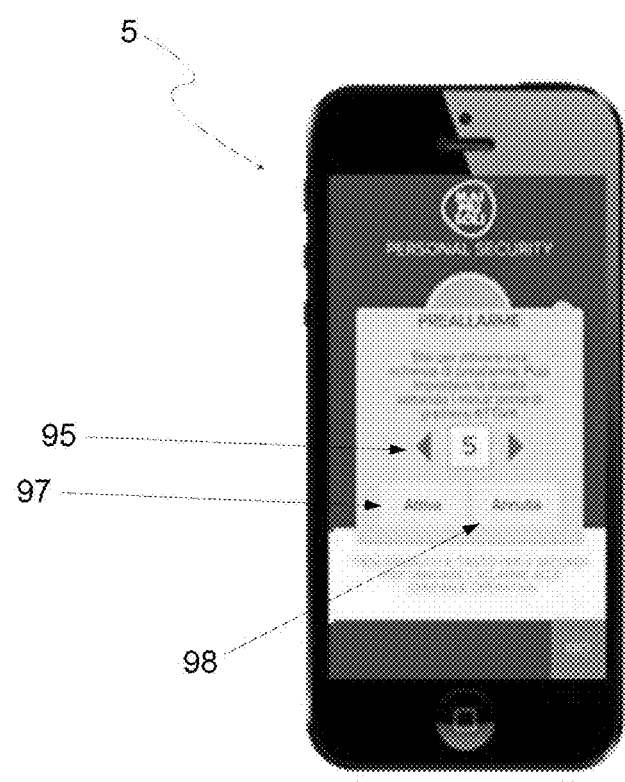
FIG. 4 shows a view of an interface in accordance with the invention for setting, commencing, and/or canceling a timer for count-down.

Further in accordance with a preferred embodiment of the invention, the main interface presents a second control 70, preferably a different color (e.g., yellow) than that of the first control 80. Upon activation of this control (Step 07), the app enters into a warning mode (Step 09) and directs the portable electronic device 5 to immediately cause the portable electronic devices 5 to send identification information (based on the authentication code provided by the user) and location information (based on information determined by the geo-location device) to the emergency response server 10, but not to send an emergency alert. Instead of the latter, the app causes the portable electronic devices 5 to display an interface (Step 10) as shown in FIG. 4 with a prompt 95 for prompting the user to enter or choose a delay time in the form of a numeric value. Button controls 97,98 are also displayed for accepting the numeric value or to cancel the interface.

If the user accepts a value indicated by the prompt 95 by activating the accept button 97 (Step 11), the app causes the portable electronic device 5 to begin counting down, second-by-second, the chosen delay time.

In the event that the cancel button 98 is activated by the user prior to expiration of the count-down (Step 12), the count-down operation is canceled, the app exits the warning mode (Step 13), and the main interface may be re-displayed.

On the other hand, in the event that the cancel button 98 is not activated prior to the expiration of the count-down (Step 14), the app enters into the emergency mode (Step 06), and thereupon an emergency alert to the emergency response server 10 as would take place if the user had activated the first control 60.

Figure 5:
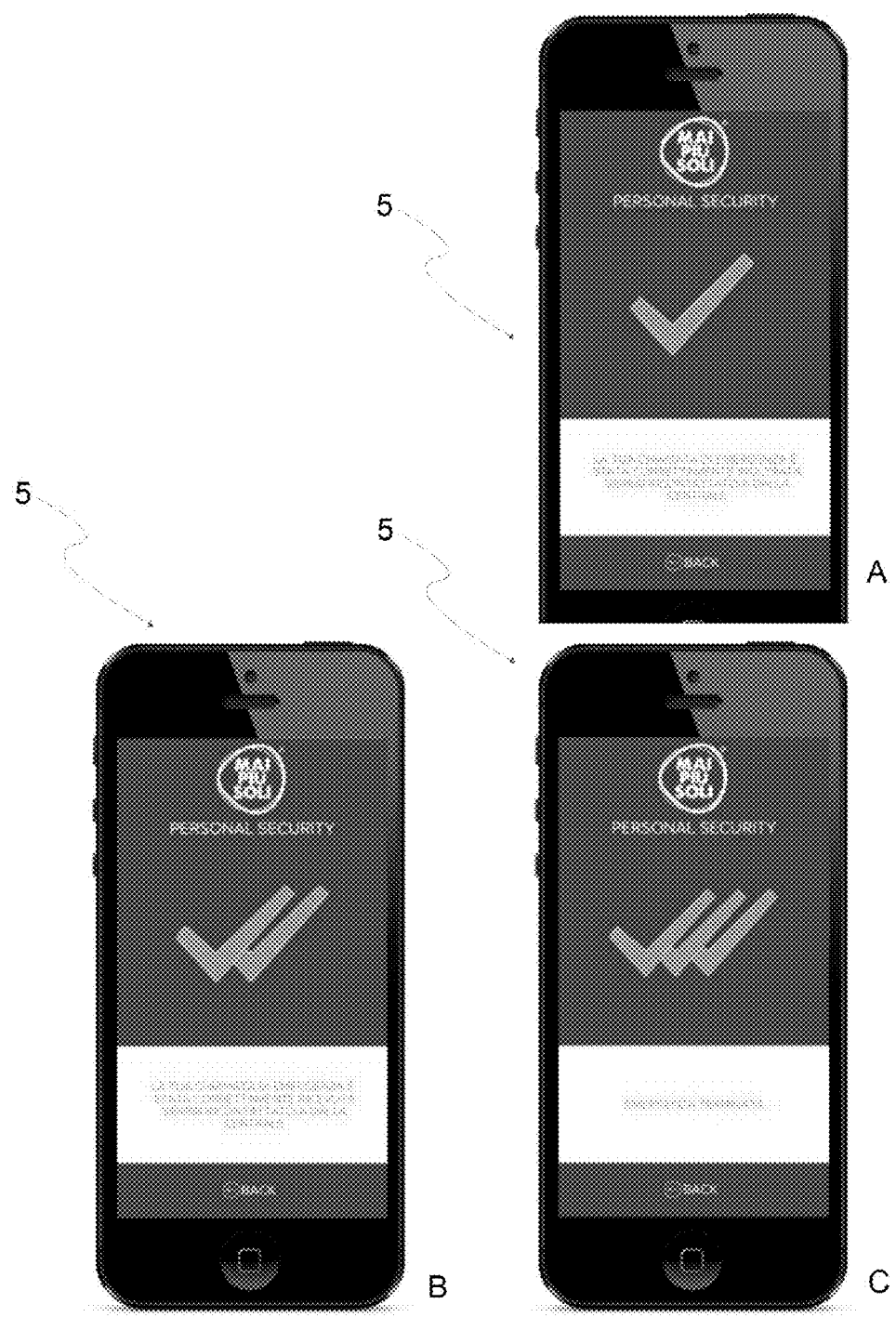
FIG. 5 shows views of interfaces indicating confirmations received from the emergency response server.

Once an emergency alert has been sent to the emergency response server 10, the app causes the portable electronic device 5 to display status interfaces such as shown in FIGS. 5A-C. In a first status interface as shown in FIG. 5A, a single green checkmark is displayed to indicate that a first confirmation message has been received from the emergency response server 10 indicating that the location information has been registered by the emergency response server 10. In a second status interface as shown in FIG. 5B, two green checkmarks are displayed to indicate that a second confirmation message has been received from the emergency response server 10 indicating that emergency procedures are in progress responsive to the user's emergency alert. In a third status interface as shown in FIG. 5C, three green checkmarks are displayed to indicate that a third confirmation message has been received from the emergency response server 10 indicating that the emergency alert has been canceled.

Figure 6:
FIG. 6 shows a view of a direct dialing interface in accordance with the invention for directly dialing an emergency response center via telephone line.

In a further preferred embodiment of the invention, the app is capable of operating when a connection cannot be established with the emergency response server 10, such as when a connection to the data network 20 is not available. In this case, activating either of the first control 60 (Step 05) or the second control 70 (Step 08) causes the portable electronic devices 5 to display a direct dialing interface (Step 15) with a telephone control 99 (see FIG. 6), whereupon activating the telephone control 99 immediately causes the portable electronic device 5 to initiate a telephone call to the emergency response center via the telephone network 25 (Step 16), thereby providing a fallback mechanism that permits the user to ask for help from emergency responders even when a data network 20 is not available.

Figure 7:
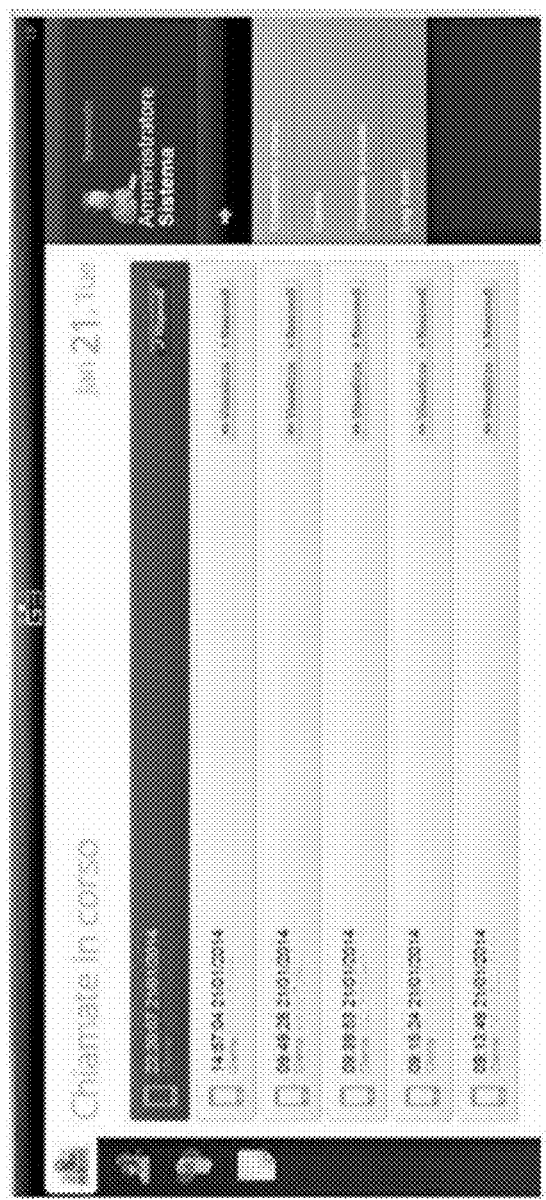
FIG. 7 illustrates an exemplary view of a display for alerting an emergency responder of an emergency alert transmitted by the portable computing device.
Figure 8:
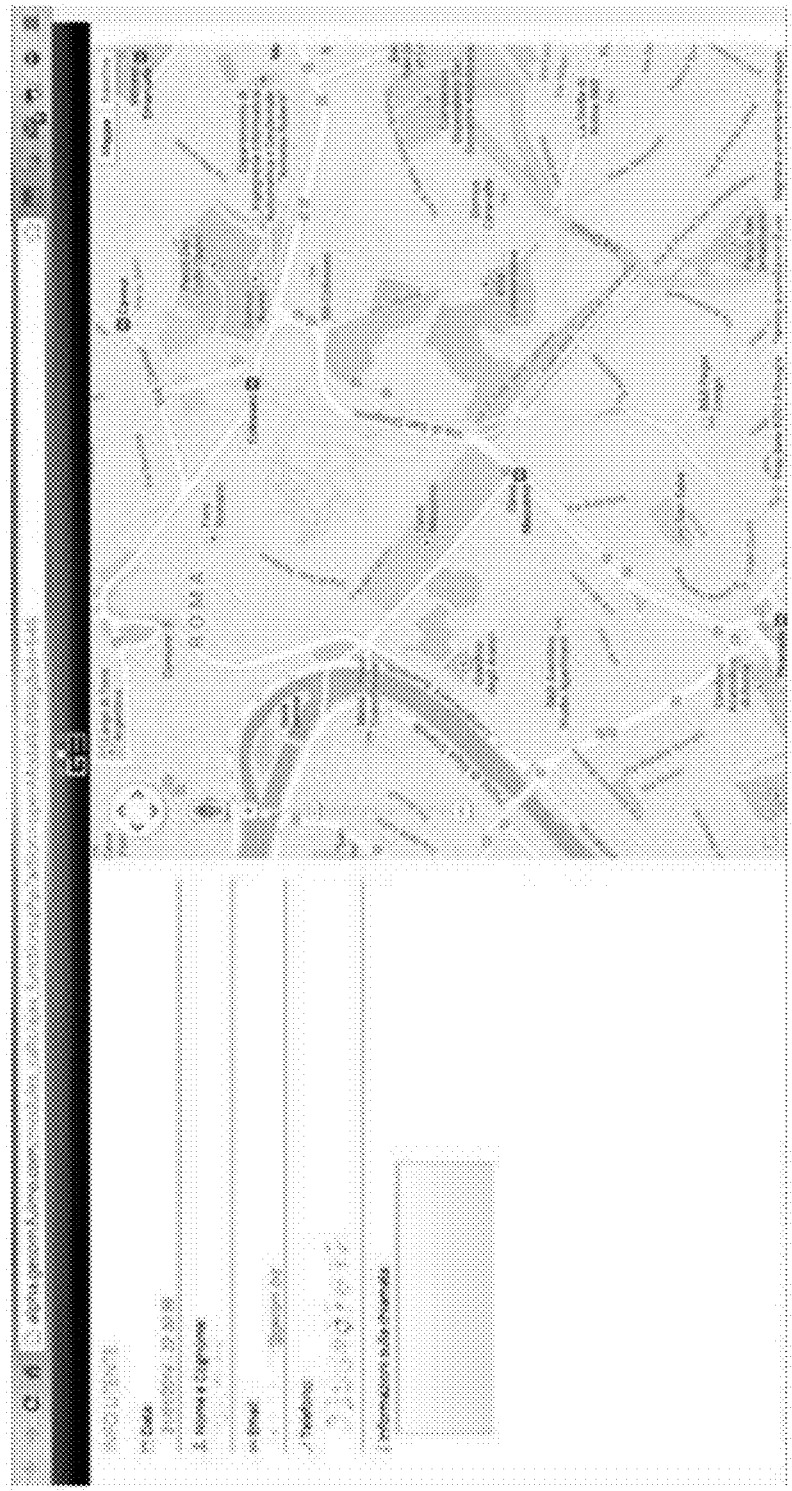
FIG. 8 illustrates an exemplary view of a display for communicating to an emergency responder geo-location information and other information transmitted by the portable computing device.

In a preferred embodiment of the invention, an emergency alert causes the emergency response server 10 to produce an audible alarm, coupled with a flashing red light signal, to alert operators in the emergency response center that an emergency has been reported by a user of the system. The emergency response server 10 facilitates presenting a reply or response button on a operator panel (see FIG. 7) for communicating with the user reporting the emergency, as well as visually displaying a geo-location of the user (see FIG. 8). In a preferred embodiment, other references and personal information of the user may also be visible on the operator panel.

Once the emergency for which the user initiated the emergency alert has been resolved, the app exits the emergency mode (Step 17), and the main interface may be re-displayed.

In the preceding description, for purposes of explanation, numerous details are set forth in order to provide a thorough understanding of the embodiments of the present invention. However, it will be apparent to one skilled in the art that these specific details are not required in order to practice the present invention. The invention as described herein may comprise one, several, all, or any of the embodiments provided above in any combination.

The above-described embodiments of the present invention are intended to be examples only. Alterations, modifications and variations can be effected to the particular embodiments by those of skill in the art without departing from the scope of the invention, which is defined solely by the claims appended hereto.

What is claimed is:

1. A non-transitory computer readable medium having software recorded thereon configured to cause a CPU of a computer device to perform the steps of:
   displaying, on a display device of the computer device, a first control and a second control,
   the first control, upon activation by a user, causing the computer device to send location information, acquired from a geo-location device built-in to the computer device, and an emergency alert to an emergency response server associated with an emergency response center via a communications interface of the computer device in connection with a communications network to which the emergency response server is capable of communicating,
   the second control, upon activation by the user, causing the computer device to
      send location information acquired from the geo-location device, and a pre-alarm alert, to the emergency response server via the communications interface,
      query the user for a time delay value,
      upon receiving the time delay value, initiate a count-down operation in accordance with the time delay value, and display a cancel control on the display device,
      in the event that the cancel control is activated by the user prior to expiration of the count-down, cancel the count-down operation, and
      in the event that the cancel control is not activated prior to the expiration of the count-down, send an emergency alert to the emergency response server.

2. The computer readable medium as recited by claim 1, wherein the display device of the computer device is touch-sensitive, wherein the first control is in the form of a button control displayed on the display device that reacts when touched by a finger of the user, and wherein the first control becomes activated after the user touches and holds the finger against the first control for a predetermined amount of time.

3. The computer readable medium as recited by claim 2, wherein the predetermined amount of time is 2 seconds or more.

4. The computer readable medium as recited by claim 1, wherein the CPU is caused to further display a first indicator and a second indicator,
   the first indicator appearing in a first color if the geo-location device is not operating, a second color if the geo-location device is in a process of activation, and a third color if the geo-location device is connected to a geo-location network and is operating normally, and
   the second indicator appearing in the first color if the communications interface is not in connection with a network in connection with the emergency response server, the second color if the communications interface is negotiating a connection with the emergency response server via the communications network, and the third color if the communications interface is in connection with the emergency response server.

5. The computer readable medium as recited by claim 1, wherein the CPU is caused to, in the event that a communications link cannot be established between the computer device and the emergency response server via the communications network, displaying a third control on the display device that, upon activation by the user, causes the computer device to establish communications with the emergency response center via a telephone interface operated by the computer device.

6. The computer readable medium as recited by claim 5, wherein the communications network is selected from the group consisting of 3G, 4G, and WiFi.

7. The computer readable medium as recited by claim 1, wherein the CPU is caused to, in the event that an emergency alert is sent by the computer device to the emergency response center by way of activation of either the first control or the second control, displaying on the display device,
- a first status indicator upon receiving a first confirmation message from the emergency response server that the location information has been registered by the emergency response server,
- a second status indicator upon receiving a second confirmation message from the emergency response server that emergency procedures are in progress responsive to the emergency alert, and
- a third status indicator upon receiving a third confirmation message from the emergency response server that the emergency alert has been canceled.

8. A method for communicating emergency information between a client computing device and a server computing device associated with an emergency response center, the client device and the server device being in connection with each other over a communications network, the method comprising:
- displaying, on a display device of the client device, a first control and a second control;
- causing, upon activation by a user of the first control, the client device to send location information acquired from a geo-location device built-in to the client device, and an emergency alert, to the server device via a communications interface of the client device in connection with the communications network to which the server device is capable of communicating; and
- causing, upon activation by the user of the second control, the client device to
  - send location information acquired from the geo-location device, and pre-alarm alert, to the server device via the communications interface,
  - query the user for a time delay value,
  - upon receiving the time delay value, initiate a count-down operation in accordance with the time delay value and display a cancel control on the display device,
  - in the event that the cancel control is activated by the user prior to expiration of the count-down, canceling the count-down operation, and
  - in the event that the cancel control is not activated prior to the expiration of the count-down, sending an emergency alert to the server device.

9. The method according to claim 8, wherein the display device of the device is touch-sensitive, wherein the first control is in the form of a button control displayed on the display device that reacts when touched by a finger of the user, and wherein the first control becomes activated after the user touches and holds the finger against the first control for a predetermined amount of time.

10. The method according to claim 9, wherein the predetermined amount of time is 2 seconds or more.

11. The method according to claim 8, further comprising:
- at the client device, displaying a first indicator and a second indicator;
- the first indicator appearing in a first color if the geo-location device is not operating, a second color if the geo-location device is in a process of activation, and a third color if the geo-location device is connected to a geo-location network and is operating normally; and
- the second indicator appearing in the first color if the communications interface is not in connection with a network in connection with the server device, the second color if the communications interface is negotiating a connection with the server device via the communications network, and the third color if the communications interface is in connection with the server device.

12. The method according to claim 8, wherein, in the event that a communications link cannot be established between the client device and the server device via the communications network, displaying a third control on the client device that, upon activation by the user, causes the client device to establish communications with an emergency response center via a telephone interface operated by the client device.

13. The method according to claim 8, wherein, in the event that an emergency alert is sent by the client device to the emergency response center by way of activation of either the first control or the second control, displaying on the display device,
- a first status indicator upon receiving a first confirmation message from the emergency response server that the location information has been registered by the emergency response server,
- a second status indicator upon receiving a second confirmation message from the emergency response server that emergency procedures are in progress responsive to the emergency alert, and
- a third status indicator upon receiving a third confirmation message from the emergency response server that the emergency alert has been canceled.

14. A system for communicating emergency information from a user to an emergency response center, comprising:
- a server computing device associated with the emergency response center;
- a client computing device associated with an emergency response center; and
- a communications network capable of transmitting messages between the server device and the client device,
- wherein each of the server device and the client device comprise a CPU and a memory,
- wherein the client device further comprises an interactive display device and one or more communications interfaces capable of communicating with each of a telephone network, a geo-location network, and a data network, and
- wherein the client device has software encoded on a non-transitory encoding medium readable by the client device sufficient to cause the client device to display, on the display device, a first control and a second control,
- the first control, upon activation by a user, causing the client device to send location information, acquired from the geo-location network, and an emergency alert to server device via the data network, and
- the second control, upon activation by the user, causing the client device to send location information acquired from the geo-location network, and a pre-alarm alert, to the server device via the data network, query the user for a time delay value, upon receiving the time delay value, initiate a count-down operation in accordance with the time delay value, and display a cancel control on the display device, in the event that the cancel control is activated by the user prior to expiration of the count-down, cancel the count-down operation, and in the event that the cancel control is not activated prior to the expiration of the count-down, send an emergency alert to the server device.

15. The system according to claim 14, wherein the client device is a portable and wireless computing device.

16. The system according to claim 14, wherein the display device of the client device is touch-sensitive, wherein the first control is in the form of a button control displayed on the display device that reacts when touched by a finger of the user, and wherein the first control becomes activated after the user touches and holds the finger against the first control for a predetermined amount of time.

17. The system according to claim 15, wherein the predetermined amount of time is 2 seconds or more.

18. The system according to claim 14, wherein the software of the client device further causes the client device to display a first indicator and a second indicator, the first indicator appearing in a first color if the geo-location network is not reachable, a second color if the geo-location network is in a process of being connected to, and a third color if the geo-location network is connected to the client device and operating normally, and the second indicator appearing in the first color if a connection with the communications network is non-operable, the second color if the client device is negotiating a connection with the server device via the communications network, and the third color if communications is established with the server device.

19. The system according to claim 14, wherein the software of the client device further causes the client device to, in the event that a communications link cannot be established between the client device and the server device via the communications network, displaying a third control on the display device that, upon activation by the user, causes the client device to establish communications with the emergency response center via a telephone interface operated by the computer device.

20. The system according to claim 14, wherein the software of the client device further causes the client device to, in the event that an emergency alert is sent by the client device to the emergency response center by way of activation of either the first control or the second control, displaying on the display device, a first status indicator upon receiving a first confirmation message from the server device that the location information has been registered by the server device, a second status indicator upon receiving a second confirmation message from the server device that emergency procedures are in progress responsive to the emergency alert, and a third status indicator upon receiving a third confirmation message from the server device that the emergency alert has been canceled.

* * * * *